(12) United States Patent
Bharadwaj et al.

(10) Patent No.: US 8,234,523 B2
(45) Date of Patent: Jul. 31, 2012

(54) AUTOMATIC DETERMINATION OF SUCCESS OF USING A COMPUTERIZED DECISION SUPPORT SYSTEM

(75) Inventors: Raj Mohan Bharadwaj, Maple Grove, MN (US); Ranjana Ghosh, Minneapolis, MN (US); David B. Goldstein, Washington, NJ (US); Vidhyashankaran Ramamoorthy Iyer, Karnataka (IN)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 12/845,589

(22) Filed: Jul. 28, 2010

(65) Prior Publication Data
US 2012/0030501 A1 Feb. 2, 2012

(51) Int. Cl.
*G06F 11/00* (2006.01)
(52) U.S. Cl. ......................................................... 714/26
(58) Field of Classification Search ...................... 714/26
See application file for complete search history.

(56) References Cited

U.S. PATENT DOCUMENTS

| | | | | |
|---|---|---|---|---|
| 5,239,547 | A * | 8/1993 | Tomiyama et al. | 714/26 |
| 6,907,416 | B2 * | 6/2005 | Tasooji et al. | 706/50 |
| 7,409,595 | B2 * | 8/2008 | Nissan-Messing et al. | 714/26 |
| 7,536,277 | B2 | 5/2009 | Pattipatti et al. | |
| 7,739,207 | B2 * | 6/2010 | Biazetti et al. | 706/15 |
| 7,757,126 | B2 * | 7/2010 | Vidiyala | 714/38.14 |
| 7,890,802 | B2 * | 2/2011 | Gerber | 714/26 |
| 2003/0236990 | A1 | 12/2003 | Hrastar et al. | |
| 2004/0143417 | A1 | 7/2004 | Hedlund et al. | |
| 2006/0167671 | A1 | 7/2006 | Sayrac et al. | |
| 2009/0228519 | A1 | 9/2009 | Purcell et al. | |

FOREIGN PATENT DOCUMENTS
EP 0810558 A2 12/1997

OTHER PUBLICATIONS

Iverson, D. L.; Inductive System Health Monitoring; NASA Ames Research Center.
Kalgren, P.W. et al.; Automated Data Translation for Avionics Health Management Through Intelligent Evidence Streams and Databases; American Helicopter Society International, Inc. 2004.
Roemer, M.J. et al.; Selected Artificial Intelligence Methods Applied Within an Integrated Vehicle Health Management System.
EP Search Report, EP 11173365.5-2221 dated Oct. 26, 2011.
EP Communication, EP 11173365.5-2221 dated Nov. 7, 2011.

* cited by examiner

*Primary Examiner* — Bryce Bonzo
(74) *Attorney, Agent, or Firm* — Ingrassia Fisher & Lorenz, P.C.

(57) ABSTRACT

Methods and systems are provided for improving the repair efficacy of a repair action using inferred feedback. The method comprises downloading a repair procedure, which has a probability of success for correcting the fault code. Repair action data is input into to the computing device and is tracked and correlated with the downloaded procedure. The method then adjusts a probability of success of the repair procedure in clearing the fault code generated by the complex system based at least on the correlation. The system comprises a means for receiving repair data, a means for tracking repair action data taken, a means for correlating the tracked repair action and the repair data, and a means for updating a probability of success of the repair action based at least in part on the correlation of the repair data, the repair action data and the operating status of the complex system.

18 Claims, 4 Drawing Sheets

AUTOMATIC DETERMINATION OF SUCCESS OF USING A COMPUTERIZED DECISION SUPPORT SYSTEM

TECHNICAL FIELD

The present invention generally relates to the health monitoring of complex systems, and more particularly relates to systems and methods that utilize inferred indications of successful corrective actions as feedback concerning the efficacy of those corrective actions.

BACKGROUND

Man has yet to invent a useful machine or a vehicle that can function throughout its designed useful life without some kind of maintenance or repair being performed. In fact, the lack of reasonable routine maintenance or repair will shorten the useful life of any asset, particularly for complex systems such as aircraft and manufacturing systems.

When a useful asset suffers a casualty in the field, there are a number isolation tests that may be applied to disambiguate the failure mode ("FM"), and then to narrow repair options down to a finite group of corrective actions ("CA"). Or conversely, to establish that a CA will not fix the FM. A CA may include either an isolation procedure or a repair procedure. Each isolation procedure and each related repair procedure has an estimated time cost and a material cost that are necessary to complete the procedure and also has a probability that the procedure will indentify and/or correct the FM.

With complex systems, such as aircraft, a casualty may result from a number of potential FM's that could be the underlying cause of the casualty. Each FM may have a particular probability of being the cause of the casualty. As a non-limiting example, an inoperative radio casualty may be caused by three probable FMs: a lack of electric power, a faulty circuit board, or a faulty squelch switch. Each FM may have an expected or a historical probability of causing that particular casualty. The probabilities of causing a particular casualty may be determined over time by testing or by historical performance and may be stored in a database for later use.

Further, it will be appreciated by those of ordinary skill in the art that some isolation procedures and repair procedures may be capable of identifying or correcting multiple FMs simultaneously, whether the FMs are related or not. Therefore, each repair procedure and isolation procedure has a probability of correcting or identifying one or more failure modes. Because one of a set of related FMs may have caused a casualty, the set of FMs is referred to as an ambiguity group. The more efficacy data that can be garnered from the field concerning the correction of an ambiguity group, the more accurate will be the correction probabilities and the lower the maintenance costs. As such, accurate feedback from maintainers is important to increase diagnostic accuracy and minimize maintenance cost. However, due to workload pressure and human nature often accurate maintainer feedback is not available.

Accordingly, it is desirable to capture as much relevant data concerning the correction of failure modes in complex systems that may be used to improve the maintenance of those systems. In addition, it is desirable to capture the relevant information despite any lack of repair feedback from the repair facility. Furthermore, other desirable features and characteristics of the present invention will become apparent from the subsequent detailed description of the invention and the appended claims, taken in conjunction with the accompanying drawings and this background of the invention.

BRIEF SUMMARY

A system is provided for improving the repair efficacy of a repair action for a complex system using inferred feedback. The system comprises a network, a first local computing device, a second local computing device, and a reasoner. The first local computing device is configured to collect failure mode data related to a failure mode from the complex system and to transmit the failure mode data over the network. The second computing device is configured to transmit repair action data and to receive repair data over the network, the repair action data and the repair data being related to the failure mode data. The system also includes a reasoner in communication with the first local computing device and the second local computing device, the reasoner being configured to correlate the operating status of the complex system, the repair action data and the repair data that is related to a specific failure mode, and to update a success probability of the repair action based at least in part on the correlation.

A system is provided for improving the repair efficacy of a corrective action for a complex system using inferred feedback. The system comprises a means for receiving repair data related to a fault code and a means for tracking repair action data taken in response to the fault code. The system further comprises a means for correlating the tracked repair action and the repair data that is related to a fault code with the operating status of the complex system, and a means for updating a probability of success of the repair action based at least in part on the correlation of the repair data, the repair action data and the operating status of the complex system.

A method is provided for inferentially validating a repair procedure for a fault code generated by a complex system. The method comprises downloading a repair procedure to a computing device. The repair procedure has a probability of success for correcting the fault code. Repair action data that is associated with the fault code is input into to the computing device and is tracked and correlated with the downloaded procedure. The method then adjusts a probability of success of the repair procedure in clearing the fault code generated by the complex system based at least on the correlation.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
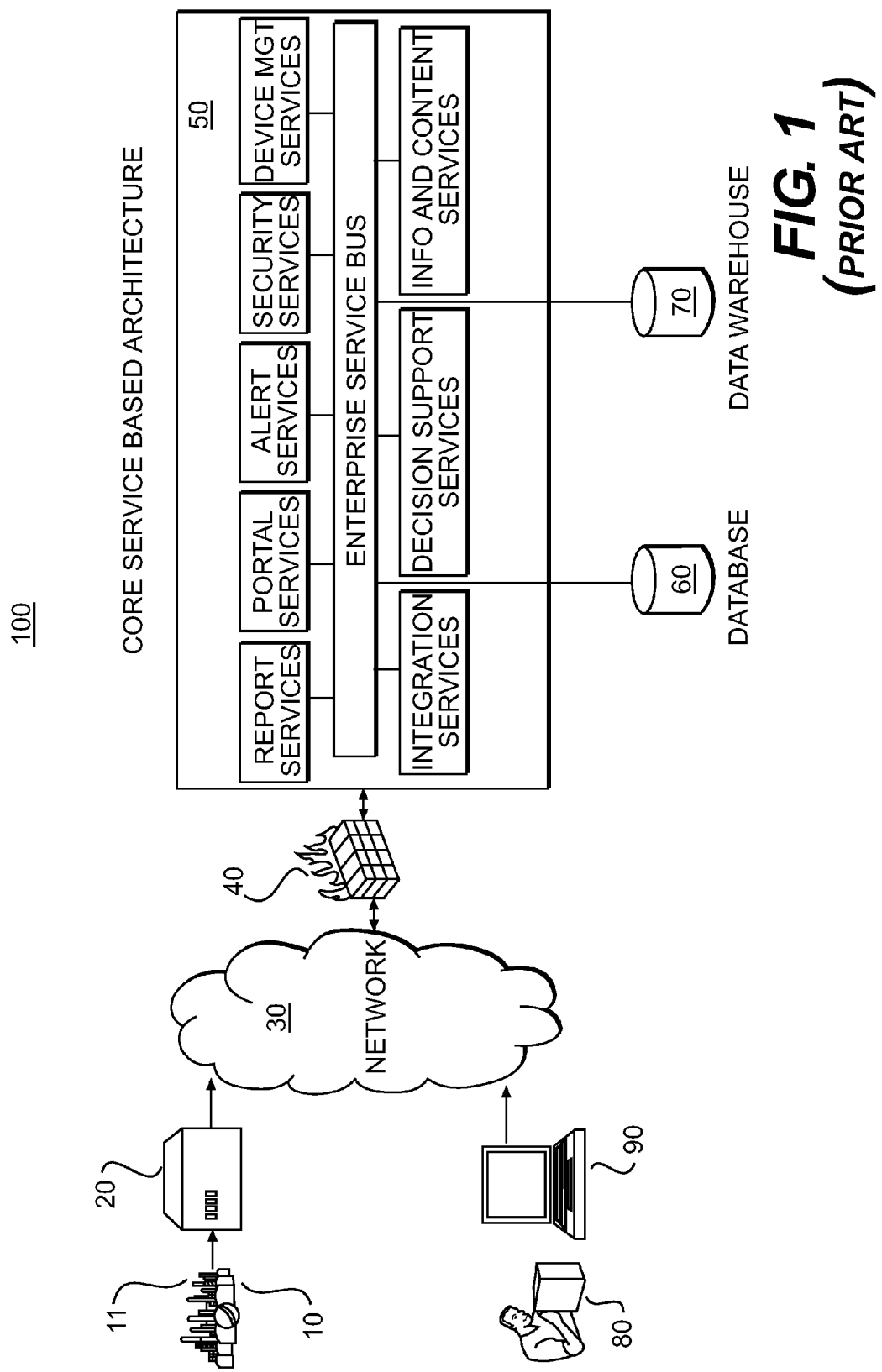
FIG. 1 is a prior art functional block diagram of a maintenance communication system.

FIG. 1 is a prior art functional block diagram of a maintenance communications network 100 ("MCN") as may be known in the art. A non-limiting example of such a network 100 is the Zing™ system operated by Honeywell International, Inc. of Morristown, N.J.

A MCN 100 system collects, processes, and interprets data generated by the various computing devices 11 associated with components or subsystems within a complex system 10, such as and aircraft, including engines, gearboxes, drive trains, rotor systems, secondary power systems, environmental controls and other dynamic components as well as monitoring other on board computing systems and avionics.

It will be appreciated by those of ordinary skill in the art that aircraft are but one non-limiting example of a complex system 10. Complex systems, as the term is used herein, may apply to any it multi-component system and may include manufacturing and chemical plants, vehicles of all types, computer systems, communication systems, combat systems, and the like.

Data from the complex system 10 can be viewed in the field within a test cell. This data is retained to allow a more detailed analysis by any skilled technician 80 with access to a personal computing device 90. Non-limiting examples of personal computing devices may be a laptop computer, a desk top computer, a cell phone or other type of suitable personal communications device. The personal computing device 90 may be a wired device or a wireless device.

The data generated from the various subsystems of the complex system 10 may be collected and routed through one or more routers 20. Router(s) 20 may be any suitably configured wireless or wired router. The router 20 may also be a general purpose computer configured to function as a server, a switch, or a router, as is known in the art.

The collected data may be transmitted to and from the complex system 10, the personal computing device 90 and a Core Service Based Architecture ("CSBA") 50 via, a network 30. Network 30 may be any suitable intranetwork or internetwork known in the art. Non-limiting examples of Network 30 include the Internet, a special purpose intranet, a packet switched telephone network, a cellular telephone network, a satellite network, a plain old telephone system (POTS), and the like as may satisfy the requirements of a particular application.

The CSBA 50 is represented by a functional block diagram of the Honeywell Zing™ system infrastructure that receives, processes, supports and provides maintenance information to technicians 80 operating in the field. The Zing™ system is a non-limiting example of a CSBA 50, which comprises one or more computing devices.

The CSBA 50 may be protected from unauthorized intrusion by a firewall 40, as may be known in the art. The CSBA 50 may store type of pertinent maintenance data in one or more data bases 60 or data warehouses 70. For example, database 60 may contain information concerning an ongoing repair operation. On the other hand, data warehouse 70 may contain longer term information such as repair procedures, repair records, technical manuals, specification sheets, drawings and the like.

Figure 2:
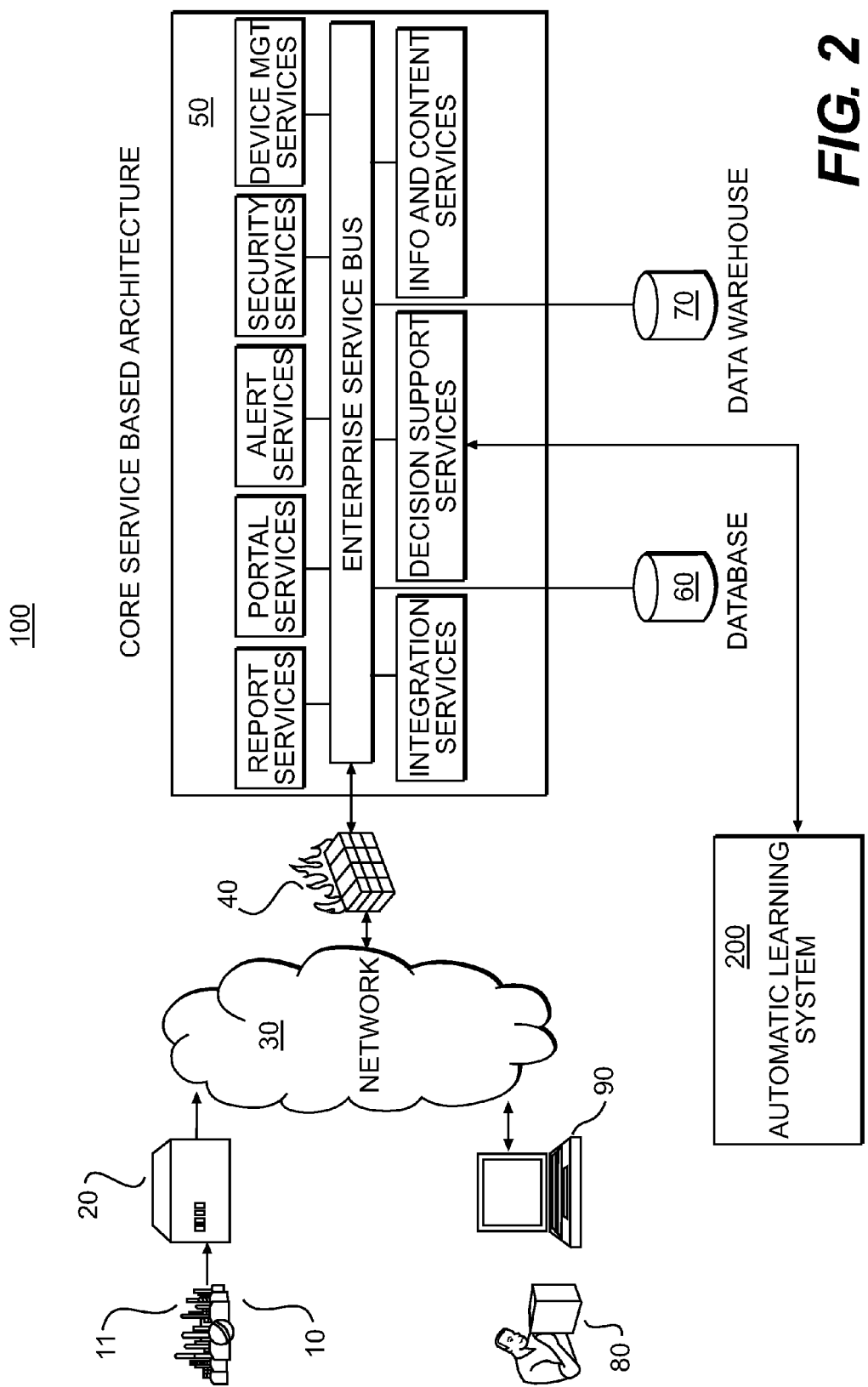
FIG. 2 is a functional block diagram of an improved maintenance communication system according to an embodiment.

FIG. 2 is a functional bock diagram of an improved CSBA 50 that includes an automatic learning system 200 ("ALS") that is configured to infer and/or deduce information about the efficacy, or ground truth, of one or more CA's from the actions performed by the technician 80 on his personal computing device 90. The term "ground truth" means the actual status or situation as opposed to what may be reported or not reported. The ALS 200 constructs a model of maximum repair accuracy guided by information stored in a database (e.g. database 60) and background repair information stored in a data warehouse (e.g. data warehouse 70). ALS 200 uses pattern regression, machine learning from examples and neural networks, among other techniques to solve problems of interest.

The ALS 200 is depicted in FIG. 2 as residing in or being in communication with the Decision Support Services 51 of the CSBA. However, one of ordinary skill in the art will appreciate that this depiction of the ALS 200 is merely exemplary. The ALS 200 may be located with or may communicate with any other suitable functional areas of the CSBA 50 without departing from the scope of the subject matter being disclosed herein. Additional exemplary, non-limiting background information concerning the computing algorithms of an ALS 200 is more fully described in *Automatic Learning Techniques in Power Systems*, Louis A. Wehenkel (Kluwer Academic Publishers (1998), which is incorporated herein by reference in its entirety.

Figure 3:
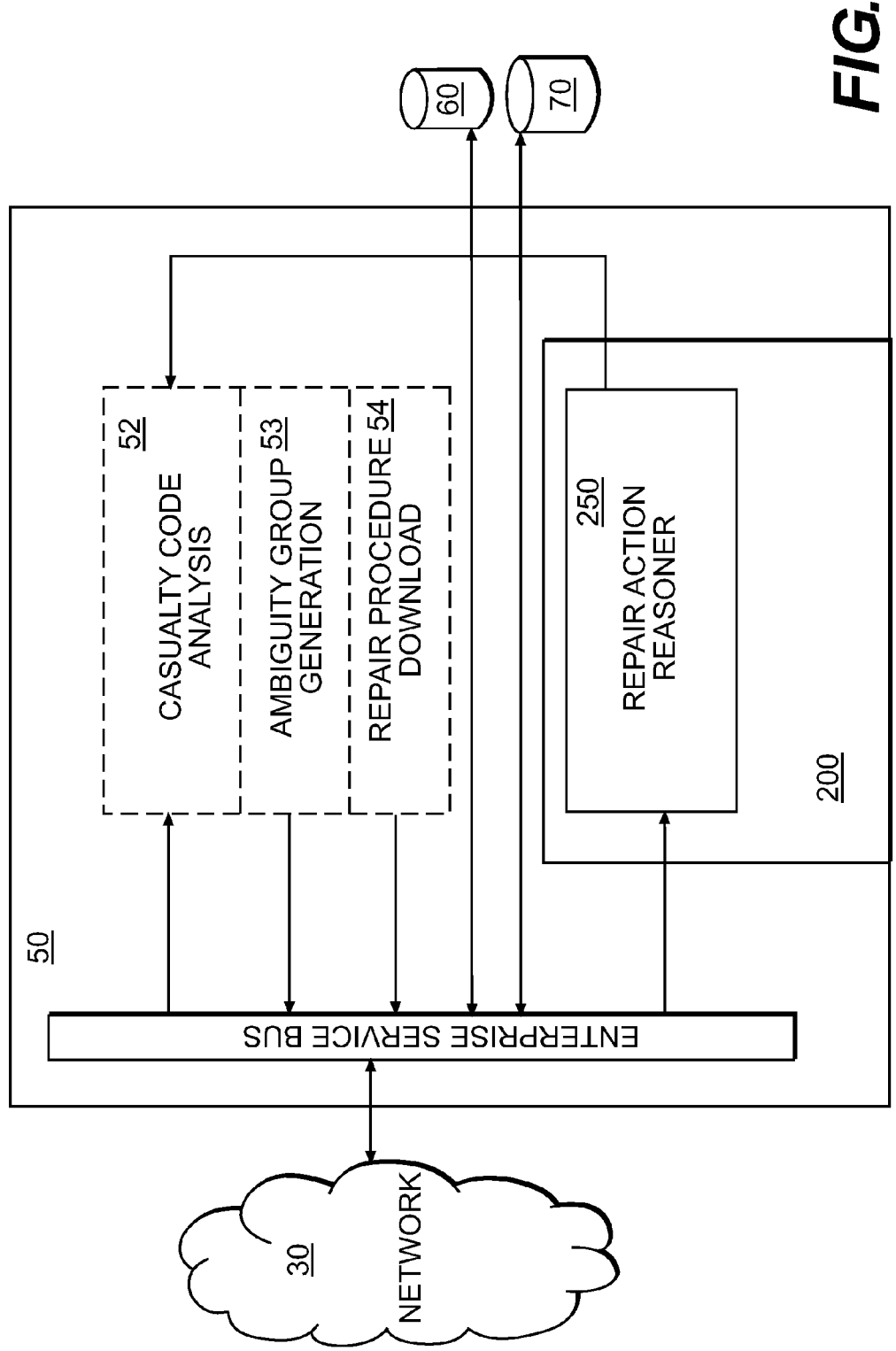
FIG. 3 is a simplified functional block diagram of an exemplary Core Service Base Architecture according to an embodiment.

FIG. 3 is a functional block diagram depicting the pertinent modules of the CSBA 50. The reference numbers therein refer to like numbers in the other figures. The CSBA 50 includes one or more modules 52, 53 that are configured to receive casualty codes from the complex system 10 and to analyze the casualty codes (e.g. 52) or to determine an ambiguity group of FM's related thereto (e.g. 53). Other modules 54 of the CSBA 50 are configured to download repair and isolation procedures/technical manuals that are relevant to the FM's of an identified ambiguity group. The repair procedures may or may not be provided until requested by the technician using his personal computing device 90 or other available computer.

One of ordinary skill in the art will appreciate that the term "module" as used herein refers to a computer system/subsystem that may include purely hardware components, purely software instructions, firmware or a combination thereof. A module may be a standalone component or it may be a sub-component of any suitable system or subsystem. A module may be a special purpose module or a general purpose module.

The CSBA 50 also includes a Repair Action Reasoner 250. The Repair Action Reasoner 250 is a module that receives repair action information from the technician 80 through his personal computer device 90 and other repair data concerning the complex system 10 and deduces and/or infers the efficacy of one or more repair actions.

The term "repair action" as used herein means any repair procedure, repair instruction, corrective action, technical manual, isolation procedure or the like provided by the CSBA 50 that provides the technician 80 with specific direction having a predetermined probability of remedying a particular FM or set of related FM's in an ambiguity group.

The term "repair action information" as used herein refers to any information inputted by the technician 80 into his personal computing device 90, or other computer, that is in any way related to a particular repair action for the complex system 10. As non-limiting examples, repair action information includes any and all keystrokes/mouse clicks made by the technician on his personal computing device, requests for specific repair instructions and the order in which they were requested, the operating status of the complex system (e.g. online or off line), test results and the order in which they were inputted, web pages viewed, website tracked actions, hyperlinks clicked on, parts and materials that were ordered and those parts and materials that were not ordered, e-mail sent, and the like. The term repair action information is not intended to include a formal repair action report whereby the technician 80 intentionally and clearly communicates feedback concerning the repair actions completed, the specific cause(s) of the failure mode and/or what specific repair action resolved a specific FM or a group thereof.

Figure 4:
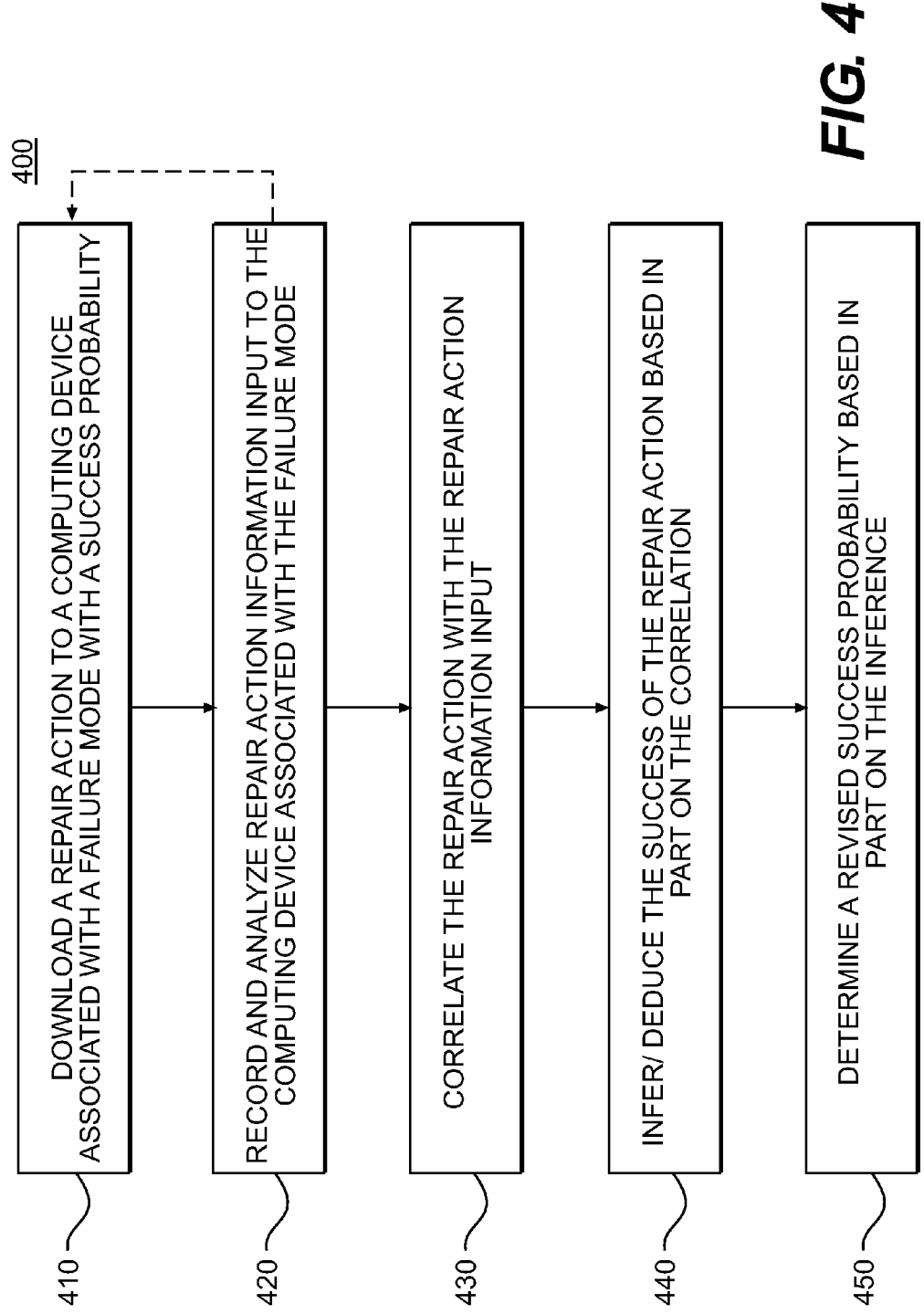
FIG. 4 is a simplified flow diagram of an exemplary method for refining the efficacy of one or more corrective actions for a complex system.

FIG. 4 is a flow diagram of an exemplary method for determining the efficacy of one or more corrective actions for a casualty in a complex system. It will be appreciated by those of ordinary skill in the art that the steps in the processes in the method may be combined, broken down into sub-processes, re-arranged and other functionally similar processes substituted without deviating from the scope of the disclosure herein.

At process 410, one or more repair actions are downloaded from the CSBA 50 to the personal computing device of the technician 80. The repair action(s) downloaded may be in response to a specific request by the technician 80, in which case the request may constitute an example of repair action information.

At process 420, the CSBA 50 receives and analyzes any repair action information associated with a repair action(s) that has been entered by the technician 80 into his personal computing device 90. One of ordinary skill in the art will appreciate that the receipt of a repair action and the technician's response thereto may be an iterative process in terms of trial and error, which is represented by the dashed arrow between processes 420 and 410. Thus, during this process both repair action information and repair actions may be generated for analysis.

At process 430, the repair action reasoner 250 correlates at least the repair action(s), the repair action information associated with the repair action(s) and the operational status of the complex system 10 to determine if the complex system has been repaired and determine which repair action resolving the casualty.

At process 440, the Repair Action Reasoner 250 of the ALS 200 infers/deduces the success of the repair action(s) based at least in part on the correlation for process 430 and data stored in the data base 60 and/or data warehouse 70. The details accomplishing such induction or deduction are beyond the scope of this disclosure and will not be discussed herein. Details on the exemplary operation of automatic learning systems and the exemplary reasoning algorithms involved therein are known in the art and more fully described in "*Automatic Learning Techniques for Power Systems*" by Wehenkel, which has been incorporated herein by reference in its entirety.

At process 450, revised success probabilities are determined by the ALS 200. The revised success probabilities replace the previous probabilities stored in the database 60 and/or data warehouse 70. As an example, Table 1 presents five exemplary failure modes FM1-FM5 included in an ambiguity group for a particular FM that is presenting specific casualty codes from the complex system 10. Each of FM1-FM5 may be associated with a repair action A-E having one of the associated success probabilities listed in Table 1. The realized success probabilities adjust historically determined success probabilities by the new data concerning the efficacy of the current repair actions.

TABLE 1

| Ambiguity Group | FM1 | FM2 | FM3 | FM4 | FM5 |
|---|---|---|---|---|---|
| Initial Probability | 10% | 20% | 20% | 30% | 20% |
| Repair Action | A | B | C | D | E |
| Successful Repair Actions | NO | NO | YES | NO | YES |
| Revised Probability | 5% | 15% | 30% | 20% | 30% |

After the complex system 10 had been restored to service, the ALS 200 may inferentially determine from the record of the technician's computer activity that repair actions C and E resolved the complex system casualty. The ALS 200 then recalculates the historical success probabilities to include the latest repair results. As such, the probabilities of success of FM1 and FM2 may be adjusted downward from 10% and 20%, respectively and the probability of success maybe adjusted upward for 20% to 30%. Similarly, the success probability of FM4 may be adjusted down from 30% to 20% and that of FM5 adjusted upward form 20% to 30%. The revised success probabilities may then be used to more accurately provide maintenance guidance for a complex system that presents the same casualty codes.

Although a detailed review of the mathematics of probability is beyond the scope of this disclosure, in data rich environments where the numbers of complex systems or subsystems thereof occur in sufficiently large numbers to accommodate meaningful statistics, the correlation between FM's may be expressed as a deviation form an independent condition where the FM's are not related. In a simplified example, the probability that an FM(1) will occur when FM(2) is already presents is given by the relationship:

$$\frac{P(FM(1) \wedge FM(2))}{P(FM(1)P(FM2)} = \frac{(n_{12})(n_{system})}{n_1 n_2}$$

Where $n_{system}$ is the number of systems in the population
$n_1$ is the number of Failure Mode 1 that has occurred
$n_2$ is the number of Failure Mode 2 that has occurred While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for refining a repair probability of a corrective action for a complex system, comprising:
   a network;
   a first local computing device configured to report an operating status of the complex system and to transmit failure mode data presented by the complex system over the network;
   a second local computing device configured to transmit repair action data to and receive repair data over the network, the repair action information and the repair data being related to the failure mode; and a reasoner in operable communication with first local computing device and the second local computing device, the reasoner being configured to:

correlate the operating status of the complex system, the repair action information and the repair data, and update the repair probability of the repair action based at least in part on the correlation.

2. The system of claim 1, wherein the network is the Internet.

3. The system of claim 1, wherein the repair data comprises a probability weighted ambiguity group comprising one or more possible failure modes.

4. The system of claim 3, wherein the repair data comprises repair instructions for one or more failure modes.

5. The system of claim 1, wherein the failure mode data comprises casualty codes.

6. The system of claim 1, wherein the repair action information comprises one or more accomplished maintenance actions.

7. The system of claim 6, wherein the one or more accomplished maintenance actions is placing a request for repair data for a particular failure mode.

8. The system of claim 6, wherein the one or more accomplished maintenance actions is one of a communication sent from the local computing device to the remote computing device and a log of specific keystrokes required to form the communication.

9. The system of claim 1, wherein the network and the reasoner are in communication via a remote computing device.

10. A method for inferentially validating a repair procedure for a fault code generated by a complex system, comprising:

downloading a repair procedure to a computing device, the repair procedure having a probability of success for correcting the fault code;

tracking repair action information input to the computing device, the repair data being associated with the fault code;

correlating the downloaded repair procedure and the tracked repair action information; and adjusting a probability of success of the repair procedure in clearing the fault code generated by the complex system based at least on the correlation.

11. The method of claim 10, further comprising:
receiving a fault code from the complex system.

12. The method of claim 11, further comprising:
receiving a request for repair data from the computing device.

13. The method of claim 11, wherein the tracked repair action information is an electronic keystroke log created on the computing device relevant to failure mode.

14. The method of claim 11, wherein the tracked repair action information is one of a list of repair actions performed and a list of repair actions not performed that are relevant to the failure mode.

15. The method of claim 11, wherein the tracked repair action information is one of a list of repair materials ordered and a list of repair materials not ordered that are relevant to the failure mode.

16. The method of claim 11, wherein the tracked repair action information is a list of web pages displayed on the computing device that are relevant to the fault code and the order in which the web pages were displayed.

17. A system for improving the repair efficacy of a corrective action for a complex system using inferred feedback, comprising:

means for receiving repair data related to a fault code;

means for tracking repair action information taken in response to the fault code;

means for correlating the tracked repair action and the repair data that is related to a fault code with the operating status of the complex system, and means for updating a probability of success of the repair action based at least in part on the correlation of the repair data, the repair action information and the operating status of the complex system.

18. The system for improving the repair efficacy of a repair action for a complex system of claim 17, wherein the repair action information is a keystroke log containing the keystrokes made on a maintenance computer related to the corrective action.

* * * * *